US008622727B2

(12) United States Patent
Schill et al.

(10) Patent No.: US 8,622,727 B2
(45) Date of Patent: Jan. 7, 2014

(54) APPARATUS AND METHOD FOR PORTIONING FOOD

(75) Inventors: Joachim Schill, Kehl (DE); Hartmut Ilch, Kehl (DE)

(73) Assignee: MAJA-Maschinenfabrik Hermann Schill GmbH & Co. KG, Kehl-Goldscheuer (DE)

( * ) Notice: Subject to any disclaimer, the term of this patent is extended or adjusted under 35 U.S.C. 154(b) by 733 days.

(21) Appl. No.: 12/598,863

(22) PCT Filed: May 5, 2008

(86) PCT No.: PCT/DE2008/000744
§ 371 (c)(1), (2), (4) Date: Apr. 15, 2010

(87) PCT Pub. No.: WO2008/135025
PCT Pub. Date: Nov. 13, 2008

(65) Prior Publication Data

US 2011/0159162 A1 Jun. 30, 2011

(30) Foreign Application Priority Data

May 4, 2007 (DE) ......................... 10 2007 021 509

(51) Int. Cl.
*A22C 17/02* (2006.01)

(52) U.S. Cl.
USPC ........... 425/195; 425/193; 425/233; 425/240; 425/310; 425/444; 426/512; 426/513

(58) Field of Classification Search
CPC ...... A22C 7/0046; A22C 7/02; A22C 7/0023; A22C 7/003; A22C 17/0006; A22C 17/002
USPC ......... 425/193, 195, 239, 240, 241, 256, 261, 425/292, 444, 449, 233, 236, 296, 310, 425/436 R; 426/512, 513
See application file for complete search history.

(56) References Cited

U.S. PATENT DOCUMENTS 3,648,600 A * 3/1972 Jaccard ......................... 100/224
3,683,797 A * 8/1972 Bettcher ....................... 100/232

(Continued)

FOREIGN PATENT DOCUMENTS

DE 37 05 118 A1 2/1987
DE 37 29 061 A1 8/1987

(Continued)

*Primary Examiner* — Seyed Masoud Malekzadeh
(74) *Attorney, Agent, or Firm* — Shlesinger, Arkwright & Garvey LLP

(57) ABSTRACT

A device and a method for portioning food, in particular meat, into portions with a predetermined weight and/or predetermined thickness are proposed. To this end a press unit (1) with at least two elongated press chambers (3$a$, 3$b$) and with respectively one closure element (5$a$, 5$b$) per press chamber (3$a$, 3$b$), a closure element drive (7) in order to displace the closure element (5$a$, 5$b$) in the press chamber (3$a$, 3$b$) and to adjust the cross section of the press chamber (3$a$, 3$b$), at least one pressure ram (8) for the press chambers (3$a$, 3$b$), which is equipped with a pressure ram drive (38) in order to displace the pressure ram (8) in the longitudinal direction of the press chamber (3$a$, 3$b$), a portioning plate (2) with several portioning chambers (9), a portioning plate drive (12) in order to move the portioning plate (2) relative to the press unit (1), a cutting element between the press unit (1) and the portioning plate (2) and a cutting element drive (34) in order to move the cutting element relative to the press unit (1) are provided.

7 Claims, 12 Drawing Sheets

(56) References Cited

U.S. PATENT DOCUMENTS

Figure 1:
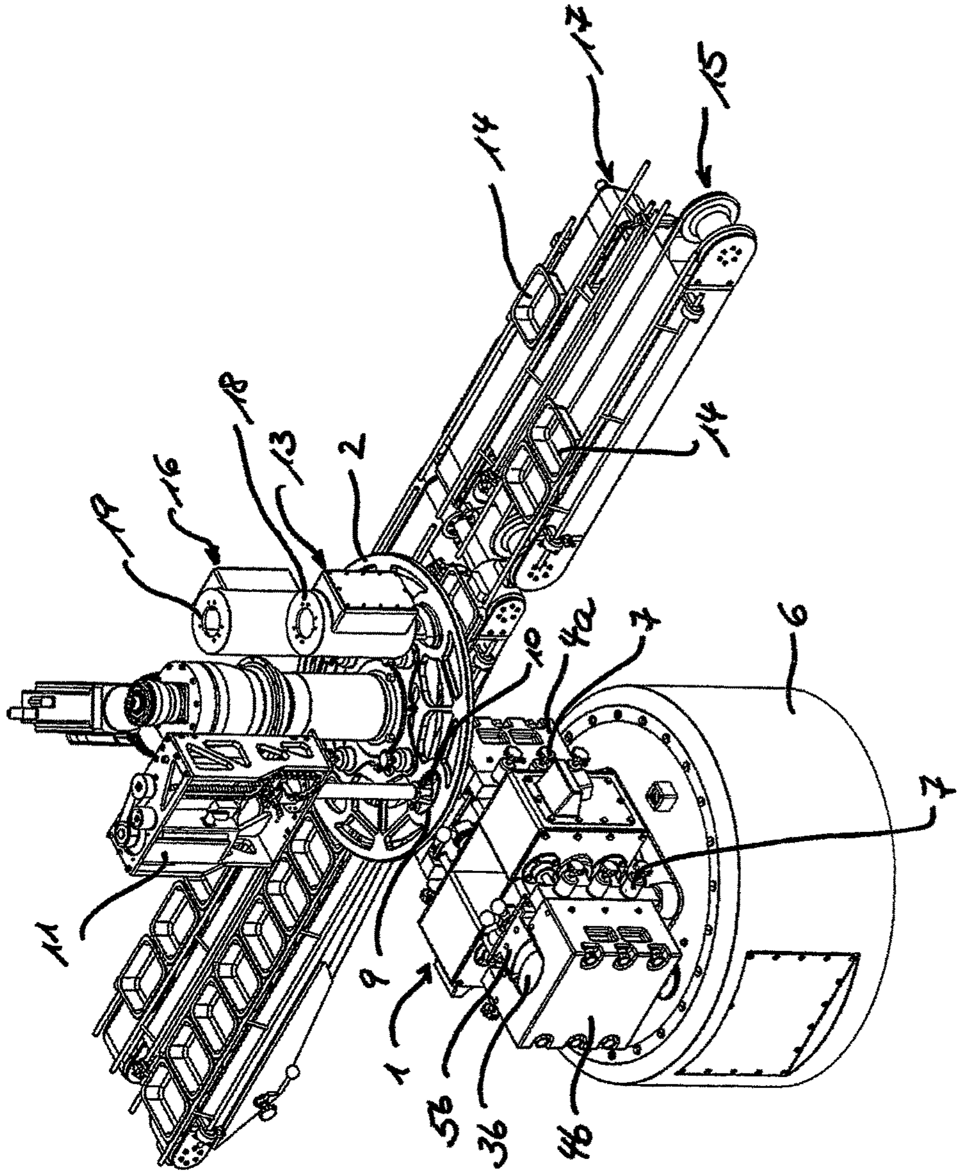

| | | | | | |
|---|---|---|---|---|---|
| 3,687,067 | A | * | 8/1972 | Bettcher | 100/218 |
| 3,704,665 | A | * | 12/1972 | Bettcher | 100/232 |
| 3,724,026 | A | * | 4/1973 | Gernandt | 425/117 |
| 3,753,398 | A | * | 8/1973 | Dohm, Jr. | 100/344 |
| 3,756,231 | A | * | 9/1973 | Ross | 100/232 |
| 3,864,891 | A | * | 2/1975 | Piereder | 53/436 |
| 3,887,964 | A | * | 6/1975 | Richards | 425/556 |
| 3,943,601 | A | * | 3/1976 | Kuhlman | 425/441 |
| 3,992,734 | A | * | 11/1976 | Chiron et al. | 452/156 |
| 4,037,827 | A | * | 7/1977 | Davison | 366/297 |
| 4,043,728 | A | * | 8/1977 | Holly | 425/256 |
| 4,057,874 | A | * | 11/1977 | Walker, Jr. | 425/318 |
| 4,113,415 | A | * | 9/1978 | Holly | 425/542 |
| RE30,096 | E | * | 9/1979 | Richards | 425/562 |
| 4,193,167 | A | * | 3/1980 | Orlowski et al. | 425/556 |
| 4,229,859 | A | * | 10/1980 | Gagliardi et al. | 426/513 |
| 4,276,318 | A | * | 6/1981 | Orlowski et al. | 426/513 |
| 4,302,868 | A | * | 12/1981 | Wagner | 425/556 |
| 4,483,046 | A | * | 11/1984 | Briddell | 425/556 |
| 4,516,291 | A | * | 5/1985 | Goldberger et al. | 426/513 |
| 4,646,385 | A | * | 3/1987 | Roberts et al. | 426/513 |
| 4,685,877 | A | * | 8/1987 | Harada | 425/190 |
| 4,735,031 | A | * | 4/1988 | Langen | 53/122 |
| 4,788,750 | A | * | 12/1988 | Bachtold | 452/35 |
| 4,807,524 | A | * | 2/1989 | Ikeuchi et al. | 99/353 |
| 4,862,558 | A | * | 9/1989 | Langen et al. | 452/138 |
| 5,021,025 | A | * | 6/1991 | Wagner | 452/174 |
| 5,030,164 | A | * | 7/1991 | Wagner | 452/174 |
| 5,364,302 | A | * | 11/1994 | Shibata et al. | 452/174 |
| 5,445,512 | A | * | 8/1995 | Bradley et al. | 425/193 |
| 5,569,070 | A | * | 10/1996 | Smith | 452/174 |
| 5,655,436 | A | * | 8/1997 | Soper | 99/353 |
| 5,730,650 | A | * | 3/1998 | Soper | 452/174 |
| 5,980,228 | A | * | 11/1999 | Soper | 425/145 |
| 6,045,071 | A | * | 4/2000 | Emsens | 241/101.4 |
| 6,383,068 | B1 | | 5/2002 | Tollett et al. | |
| 6,390,799 | B1 | * | 5/2002 | Volkl | 425/308 |
| 6,688,961 | B2 | * | 2/2004 | Smith | 452/160 |
| 6,921,326 | B2 | * | 7/2005 | Smith | 452/160 |
| 7,052,387 | B2 | * | 5/2006 | Ilch et al. | 452/155 |
| 7,374,478 | B2 | * | 5/2008 | Gasbarro | 452/149 |
| 8,011,914 | B2 | * | 9/2011 | Taylor et al. | 425/145 |
| 8,029,265 | B2 | * | 10/2011 | Hauser | 425/193 |
| 2003/0148726 | A1 | * | 8/2003 | Smith | 452/160 |
| 2004/0152407 | A1 | * | 8/2004 | Smith | 452/160 |
| 2004/0156965 | A1 | * | 8/2004 | Ilch et al. | 426/512 |
| 2007/0270093 | A1 | * | 11/2007 | Gasbarro | 452/149 |
| 2008/0230351 | A1 | * | 9/2008 | Taylor et al. | 198/467.1 |
| 2008/0233226 | A1 | * | 9/2008 | Taylor et al. | 425/135 |
| 2008/0233228 | A1 | * | 9/2008 | Lindee et al. | 425/144 |
| 2009/0255419 | A1 | * | 10/2009 | Kirsch | 99/538 |

FOREIGN PATENT DOCUMENTS

| | | | | | |
|---|---|---|---|---|---|
| DE | 306012 | | * | 8/1989 | B26D 7/30 |
| DE | 103 04 773 | A1 | | 2/2003 | |
| DE | 10 2004 041 915 | A1 | | 8/2004 | |
| JP | 2001-315093 | | * | 11/2001 | B26D 3/28 |
| WO | 03/064123 | A1 | | 1/2003 | |
| WO | 2006/123368 | A1 | | 5/2006 | |

* cited by examiner

APPARATUS AND METHOD FOR PORTIONING FOOD

PRIOR ART

The invention is based on a device and a method for portioning food, in particular meat.

Devices of this type are used to cut food into portions, for example, in the form of slices, of the same weight and/or the same thickness. The food includes, for example, fresh unprocessed meat, sausage, ham, cheese, vegetables or baked goods. Known devices for cutting sausage or cheese are also referred to as slicers. Sausage or cheese differs from fresh unprocessed meat due to its consistency in that the corresponding loaves have a solid form with a volume predetermined by the production. The slicers are therefore equipped with a device for holding the loaves during the cutting of the slices. In contrast thereto, pieces of fresh unprocessed meat do not have any solid shape or predetermined volume, unless they are deep-frozen or frozen. To portion pieces of meat of this type it is therefore not sufficient to hold the pieces of meat as in the known slicers. Devices for portioning therefore have a press chamber in which the piece of meat is first compressed. After the conclusion of the pressing operation, the volume that the piece of meat fills is known. This is used during the subsequent portioning.

Portioning devices for fresh unprocessed meat are used, for example, in commercial kitchens in the production of assembled and prepackaged meals and in the mechanical packaging of cut foods. Individual portions, in particular, quick fried pieces such as schnitzel, steaks or medallions are cut from a piece of fresh unprocessed meat or another piece of food. It is thereby important that the individual portions have a predetermined weight and, if necessary, a predetermined thickness. The slices must be portioned as exactly as possible, so that they correspond in their cooking time, the individual portions do not differ too much and the weight can be given on a preprinted packaging.

From the prior art of DE 103 04 773 A1 a device is known for positioning foods with an insertion drum with several press chambers and a portioning drum with several portioning chambers. The piece of food is compressed in a press chamber with the aid of a lateral lid and a pressure ram and pressed into a portioning chamber. Subsequently, the portion located in the portioning chamber is cut off from the piece of meat with the aid of a knife moveable between the press chamber and the portioning chamber, and the portion is removed from the portioning chamber. For this purpose, the portioning chamber is rotated. A further portioning chamber of the portioning drum thereby reaches the extension of the press chamber. While the one portion is removed from one of the portioning chambers, the other portioning chamber can already be filled with the food again. This process is repeated until the all of the food has been cut up into portions. During the portioning, another piece of food can be inserted into a second press chamber of the insertion drum. When the first piece of food has been completely divided into portions, the insertion drum is rotated. The portioning can subsequently be continued with the second piece of food. A piece of food can again be inserted into the press chamber, which is now empty.

It has proven to be disadvantageous in this known prior art that the cross section of the press chambers, the pressure ram and the portioning chambers is firmly predetermined and cannot be adjusted to the respective food. However, this is important in the case of meat, since the pieces to be portioned can deviate from one another greatly in terms of their size and consistency. At most, to make adjustments, the user can replace the insertion drum and the portioning drum, which is associated with a high expenditure in terms of time and costs. If the user dispenses with an adjustment, this leads to undesirable deviations in the weight of the individual portions.

Furthermore, it has proven to be disadvantageous that the slices with the known device cannot be automatically further processed after portioning, for example, cut into cubes or strips, or provided with the necessary cut for Schnitzel Cordon Bleu.

Finally, it has proven to be disadvantageous that the residual pieces that do not meet the requirements in terms of weight usually must be separated by hand from the cut slices. Slices of this type usually occur, for example, as the last slice of a piece to be divided into slices. Furthermore, it is not possible to cut off from a piece slices with different stipulations with regard to the weight and to sort these slices automatically.

Furthermore, it is not possible to move the pressure ram of the press chamber or the chamber floor of the portioning chamber into an exactly predetermined position and to vary this position or to adjust the position to the force with which the piece is compressed.

THE INVENTION AND ITS ADVANTAGES

Compared to the prior art, the device according to the invention with the features as disclosed herein has the advantage that the cross section of the press chamber closed at the side by a closure element and the cross section of the pressure ram can be changed and thus adapted to the food to be portioned. The press chamber forms an elongated duct, on the longitudinal side of which a closure element that can be adjusted in its position to the rest of the press chamber is arranged. A separate closure element is assigned to each press chamber. The cross section of the press chamber that is closed by the closure element depends on the size of the distance of the closure element from the opposite wall of the press chamber. In a preferred manner, the closure element is thereby guided by two side walls of the press chamber lying opposite one another. A closure element drive is used to displace the closure element in the press chamber. This can be, for example, an electric motor, in particular a servomotor or stepper motor, a pneumatic drive or a hydraulic drive.

The pressure ram closes the press chamber on one of the two front faces. In order to prevent the food that is compressed in the press chamber by the pressure ram and the closure element from being able to expand into a space between the pressure ram and the press chamber, it is important that the cross section of the pressure ram is adapted to the cross section of the press chamber. In order to guarantee this adjustment, the pressure ram is equipped with two pressure ram elements that define a press surface. These can be moved relative to one another in order to enlarge or reduce the press surface and thus the cross section of the pressure ram as desired.

The adjustment of the two pressure ram elements to one another can be adjustable by means of the closure element. The pressure ram elements thus automatically follow the movement of the closure element. The adjustment of the pressure ram to the cross section of the press chamber thus takes place automatically.

In a preferred manner, the pressure ram elements are pressed against one another or pressed together by the press chamber and the closure element. With an enlargement of the cross section of the press chamber by displacement of the closure element, the two pressure ram elements move apart from one another, whereby the cross section of the pressure ram is enlarged again. To this end, at least one spring can be arranged between the pressure ram elements. The spring is placed in the two pressure ram elements such that it is already compressed in the starting position of the press chamber in which the closure element has the greatest possible distance from the floor of the press chamber. The spring force exerted on the two pressure ram elements presses the two pressure ram elements apart from one another and has the tendency to increase the distance between the two pressure ram elements. The press chamber and the closure element counteract this force. They limit the lateral movement of the pressure ram elements and thereby ensure that the two pressure ram elements cannot move apart from one another to an arbitrary extent. The spring and the press chamber as well as the closure element jointly ensure that the pressure ram with its press surface fills the entire cross section of the press chamber closed by the closure element. A space between the press chamber, the closure element and the pressure ram is avoided thereby.

The portioning chambers can be adapted with regard to their cross section to the cross section of the press chambers. To this end, the portioning chambers have a lateral opening in the portioning plate. The opening is covered by a portioning chamber part. This is arranged on the portioning plate in a moveable manner. The adjustment of the portioning chamber part relative to the portioning chamber is preferably carried out automatically. To this end, either suitable sensors for detecting the position of the closure element of the press chamber and a drive for the corresponding movement of the portioning chamber part are provided or guides or transmissions are provided that transfer a movement of the closure element to a corresponding movement of the portioning chamber part.

Furthermore, the portioning chamber has a chamber floor, which is composed of at least two chamber floor elements that can be moved with respect to one another. The spacing of the chamber floor elements can be changed to adjust the cross section of the chamber floor. Advantageously, the chamber floor elements are pressed against one another by the portioning chamber and the portioning chamber part. In this manner the chamber floor is automatically adapted to the cross section of the portioning chamber. To this end, a spring can be arranged between the two chamber floor elements. The chamber floor elements are pressed apart and pressed against the walls of the portioning chamber by the spring force. When the cross section of the portioning chamber is reduced, the two chamber floor elements and the spring are pressed together. The pressure-loaded spring ensures that the two chamber floor elements are pressed as far apart as possible and fill the entire available cross section of the portioning chamber. This prevents it being possible for a gap to form between the chamber floor and the portioning chamber, in which gap the food can escape. Spaces or gaps of this type can lead to inaccuracies in the weight of the portions.

According to an advantageous embodiment of the invention, the pressure ram elements and/or the chamber floor elements have several finger-like extensions on the side facing one another, which extensions engage with one another in the joined state of the pressure ram elements and/or engage with one another in the joined state of the chamber floor elements. The spacing of two adjacent extensions of a pressure ram element and/or of a chamber floor element thereby corresponds to the width of an extension of the other pressure ram element and/or the other chamber floor element. This ensures that the finger-like extensions, as with two chambers, engage with one another and reciprocally bear against one another. With the smallest possible spacing of the elements, the finger-like extensions of one element fill the spaces between the finger-like extensions of the other element completely. When the pressure ram elements and/or the chamber floor elements are removed from one another, a spacing forms between the tip of each finger-like extension and the apex of the associated space between two finger-like extensions of the other element. Compared to the total surface of the elements, however, this gap is very small. In order to prevent it being possible for the food to penetrate into these gaps during compression, at least the area of the engaging extensions of the pressure ram elements and/or of the chamber floor elements is advantageously covered by a plate. Since the spaces are small, the pressure ram can build up the necessary force for compressing and displacing the piece of food without the pressure ram elements or the plate being able to deform. The same applies to the chamber floor.

According to a further advantageous embodiment of the invention, the chamber floor is arranged in a displaceable manner for adjusting the depth of the portioning chamber. In this manner portions of differing thickness can be produced. Furthermore, it is possible to collect several portions in the portioning chamber before they are ejected jointly from the portioning chamber. In this case, after the cutting one portion remains in the portioning chamber and the chamber floor is displaced such that there is room for a further portion in the portioning chamber. These steps can be repeated several times, until the entire stipulated depth of the portioning chamber has been exhausted and the chamber floor has reached an end position.

According to a further advantageous embodiment of the invention, a sensor for detecting the force that is exerted by the piece of food on the closure element during displacement is arranged on the closure element of the press chamber. This force is greater, the further the closure element is inserted into the press chamber and the cross section of the press chamber is thereby reduced. The detection of the force renders possible an adjustment of the closure element depending on the force counteracting the drive of the closure element, which in turn depends on the food, in particular on its shape and its consistency.

According to a further advantageous embodiment of the invention, a force limiter is arranged on the closure element of the press chamber. This force limiter typically contains a force sensor. When a predetermined maximum force has been reached, which is exerted by the piece of food on the closure element during the displacement of the closure element in the press chamber, the closure element is stopped in the associated position relative to the press chamber. This ensures that the closure element remains in the respective position and cannot move back into its starting position when the drive is stopped.

According to a further advantageous embodiment of the invention, a displacement sensor is arranged on the closure element. This serves to determine the distance covered by the closure element during the compression of a piece of food or to determine the absolute position of the closure element with respect to the press chamber. Displacement sensors of this type are also referred to as distance transducers. Based on the distance covered by the closure element during the compression of the food, the cross section of the press chamber closed by the closure element can be determined. From the cross section of the press chamber, the density of the food and the desired target weight of the portions, the depth of the portioning chamber and thus the position of the chamber floor is subsequently determined.

According to a further advantageous embodiment of the invention, a collection container for collecting several portions is arranged on the portioning plate on the side facing away from the press unit. The cross section of the collection container matches the cross section of the portioning chambers. The chamber floor of the portioning chamber is displaceable in the collection container. This makes it possible to cut several portions and to collect the portions before they are ejected from the portioning chamber. In a preferred manner, the collection container can be moved together with the portioning plate, so that both parts can be transferred jointly into an ejection position while the portioning operation is continued with another portioning chamber of the portioning plate.

According to another advantageous embodiment of the invention, an ejector element is arranged on the portioning plate, which ejector element ejects one or more cut portions from the portioning chamber. This is, for example, a ram that moves into the portioning chamber from one side and pushes the portions out of the portioning chamber. The process of ejecting one or more portions from the portioning chamber is accelerated thereby.

According to another advantageous embodiment of the invention, a mold is arranged on the side of the portioning plate facing away from the ejector element, the cross section of which mold matches the cross section of the portioning chambers. The ejection element ensures that the cut portion is transferred to an additional mold in the form predetermined by the portioning chamber. The further handling and processing of the portion can be carried out in this mold. The mold can be equipped, for example, with several blades for cutting cubes or strips. The portion is thus divided into further small sections during the ejection from the portioning chamber. This is carried out in one step without additional stations being necessary. Furthermore, the portioning process can be continued during the further handling and processing of the portion.

According to a further advantageous embodiment of the invention, the chamber floor of the portioning chamber is equipped with channels for suctioning and/or emitting air or other gases. The device has pins, the cross section of which matches the cross section of the channels or is slightly smaller. Furthermore, a pin drive is provided, which inserts the pins into the channels with a specific position of the portioning plate and thereby frees the channels from contaminants. A cleaning of this type can be carried out automatically after a predetermined number of portions or as necessary.

According to a further advantageous embodiment of the invention, the press unit is aligned vertically. The press chambers thereby run in the vertical direction in their longitudinal direction. The pressure ram is arranged on the underside of the press unit. The cutting element is located on the top of the press unit. The portioning plate is arranged above the cutting element. This arrangement is characterized in that the press chambers can easily be filled from above with a piece of food. The opening of the press chamber accessible from above is located at a height that is convenient for the user. The feed through the pressure ram is carried out from the bottom upwards. The portions cut off from the piece are transferred lying on the knife with the portioning chamber into an ejection position. With the further rotary movement of the cutting element, the portioning chamber is cleared from below. Through an ejection element acting from above, the cut portion is pressed downwards and falls onto a conveyor device or a transport device or a container in which the cut portions are collected.

According to a further advantageous embodiment of the invention, one or more transport devices are arranged below the portioning plate in order to receive and transport the cut portions. With a round portioning plate with, for example, four portioning chambers, in addition to the position of the actual portioning process, for example, three positions for depositing cut portions are possible. A separate transport device can be assigned to each of these portions. In this manner portions can be deposited on different transport devices depending on their weight or their quality.

According to a further advantageous embodiment of the invention, the press unit and the portioning plate can be rotated above two parallel axes spatially separated from one another. This renders possible a particularly rapid and efficient movement of the press unit and the portioning plate.

The device according to the invention with the features as disclosed herein is characterized in that an ejector element is arranged on the portioning plate in order to eject a cut slice from a portioning chamber. The ejector element is arranged on that side of the portioning plate that is facing away from the press chamber. Moreover, the ejector element is provided at the position at which the cut slices are placed on a transport device or in a container. The ejector element supports the process of the detachment of a cut slice from a portioning chamber. Furthermore, a mold or tray is arranged on the side of the portioning plate facing away from the ejector element, the cross section of which mold or tray matches the cross section of the portioning chambers. A cut slice is pressed out of a portioning chamber into the mold by the ejector element. While the portioning plate is moved in order to cut off a further portion from a piece and to release another cut slice, the slice held in the mold remains in its position and can be further processed if necessary. It can be utilized thereby that the portion is fixed in the mold. This is an advantage for the further processing, since the portion cannot avoid the accessory or tool used for processing in the mold. In the form the portion can be cut, for example, and/or provided with further ingredients.

According to an advantageous embodiment of the invention, cutting tools such as, for example, knives, cutters or blades, are arranged in or on the mold in order to cut the portion arranged in the mold into strips or cubes or to generate a cut pocket. In pockets of this type ingredients can be filled into the portion, for example, cheese and ham in the case of a Schnitzel Cordon Bleu. The cutting tools can be arranged in either a fixed or a moveable manner in or on the mold. A relative movement between the portion to be cut and the cutting tool is necessary for cutting. If the cutting tool is arranged in or on the mold in a fixed manner, the cutting takes place during the insertion of the portion into the mold and/or during the removal of the portion from the mold. If the cutting tool is arranged on the mold in a moveable manner, the cutting can also be carried out while the portion is in the mold. Advantageously, the mold is equipped with a guide for the moveable cutting tool. This can be a slot in the mold, for example.

According to an advantageous embodiment of the invention, the mold is arranged at a spatial distance from the press unit. It thus does not impede the process of portioning and cutting the individual portions. The placement of the cut portions in the mold and optionally the further processing of the portion in the mold does not take place until the cutting operation has been completed. At the same time as the placement of a portion into the mold, another portion can be cut off from the piece in the press unit.

All of the features of the device as disclosed herein can be combined with all of the other features as disclosed herein.

The device according to the invention with the features as disclosed herein is characterized in that at least two transport devices are arranged beneath the portioning plate and that the portioning plate has at least three end positions: a first end position in which a portion is cut from a larger piece, a second end position in which the portion is deposited at or on the first transport device and a third end position in which the portion is deposited at or on the second transport device. Further transport devices and a corresponding number of further end positions of the portioning plate can also be provided. The transport devices can be, for example, transport belts for depositing portions or conveyors for packages, for example, dishes or containers. On a transport belt the individual portions can be deposited after ejection from the portioning chamber stacked in groups in an overlapping manner or individually spaced apart from one another. This depends on the speed of the transport belt compared to the speed of the portioning operation. With a conveyor for packaging, the cut portions after cutting are deposited directly from the portioning plate in the packaging. The relative position of the individual portions to one another can be influenced by the speed of the conveyor here, too. Residual pieces or other pieces that do not meet the weight specifications can be deposited on the second transport device. They do not obstruct the portions on the first conveyor device and their assignment to certain packages. Sorting by hand does not apply. Furthermore, portions of different weights can be deposited on the two transport devices. Thus a piece can be divided by the portioning device into portions of a first and a second predetermined weight. The portions with the first weight are deposited on the first transport device and the portions with the second weight are deposited on the second transport device. In this case, advantageously a third transport device and a fourth end position of the portioning plate are provided in order to deposit residual pieces.

According to an advantageous embodiment of the invention, the portioning plate is arranged to be rotatable around an axis. It furthermore has an even number of portioning chambers, all of which are arranged at the same radial distance from the axis and at the same angular distance from one another in the portioning plate. The rotatable arrangement of the portioning plate has the advantage that the portioning plate can be moved more quickly than with a displaceable arrangement. This leads to shorter cycle times. If all of the portioning chambers in the portioning plate have the same radial distance from the axis and if there is an even number of the portioning chambers, the portioning and cutting and the depositing of cut portions on different transport devices can occur simultaneously. The cycle time of the device is thus increased.

According to a further advantageous embodiment of the invention, the press unit and the portioning plate can be rotated about two parallel, spatially separated axes. The rotatable arrangement ensures that the movement of the press unit and the portioning plate can run more quickly than with a displaceable arrangement. Two spatially separate axes mean that the press unit and the portioning plate do not reciprocally impede one another in their movements and that the ejection or placement of the cut portions from the portioning chambers of the portioning plate takes place at a spatial distance from the press unit and thus sufficient space is available for the transport of the cut portions. Parallel axes are an advantage, since the cut is usually made perpendicular to the direction of the feed of the piece in the press chamber, and the press chambers are arranged with their longitudinal axes parallel to the axis of the press unit.

All of the features of the device as disclosed herein can be combined with all of the other features as disclosed herein.

The device according to the invention with the features as disclosed herein has the advantage that it is equipped with a servo drive for the pressure ram and/or for the chamber floor. The pressure ram and/or the chamber floor can thus move into different preset positions and retain them. The positions of the pressure ram and/or chamber floor can furthermore be dependent on the force with which a piece is compressed. This is a great advantage in particular for the press chamber. The pressure ram can be pushed forwards in the press chamber until the piece presses with a specific preset force against the pressure ram. The movement into and retention of a preset position or displacement of the pressure ram until a preset counterforce has been reached is undertaken by a control system. To this end, the device is equipped with suitable sensors, which measure a distance covered, a spacing between two measured points, an absolute position based on a zero point or a force. Electric motors, pneumatic drives or hydraulic drives can be used as motors. Electric motors are particularly suitable. To achieve higher cycle times, quick drives are advantageous which displace the pressure ram or the chamber floor to a desired position in the shortest time possible.

According to an advantageous embodiment of the invention, the pressure ram and/or the chamber floor are equipped with a force sensor. This force sensor is used to measure the force with which the piece presses against the pressure ram and vice versa. The same applies to the chamber floor. This measured force is entered into the control system of the servo drive.

According to another advantageous embodiment of the invention, the pressure ram and/or the chamber floor are equipped with a distance sensor or a position sensor. While the distance sensor measures a distance covered by the pressure ram or the chamber floor, the position sensor determines the absolute position of the pressure ram or the chamber floor based on a preset zero point. The value measured by the sensor is entered into the control system of the servo drive.

All of the features of the device as disclosed herein can be combined with all of the other features as disclosed herein.

According to the method for portioning food according to the invention with the features as disclosed herein, a piece of food is placed in an elongated press chamber of a portioning device, and the cross section of the press chamber is adjusted depending on the piece of food. The adjustment can be carried out automatically depending on the resistance that counteracts the closure element during the reduction of the cross section of the press chamber. When the cross section of the press chamber is adjusted, the cross section of the pressure ram and the cross section of the portioning chamber are automatically adjusted to this cross section. In this manner an optimized positioning is possible, which is respectively adjusted to the individual piece of food. Furthermore, the cross section of a portioning chamber is adjusted to the cross section of the press chamber.

Furthermore, the force is determined that the food exerts on the press chamber during the reduction of the press chamber. Advantageously, before the start of the portioning operation the cross section of the press chamber is reduced until a maximum predetermined force has been achieved. Subsequently, the closure element of the press chamber remains in this position and the cross section is maintained.

In a preferred manner this adjustment is carried out before the start of the portioning operation. However, it is also possible to continuously adjust the cross section of the press chamber during portioning, so that the predetermined maximum force is maintained. The cross section of the press chamber is adjusted and the adjusted cross section is determined based on force sensors and distance sensors.

Further advantages and advantageous embodiments of the invention are shown by the following description, the drawing and the claims.

DRAWING

Figure 2:
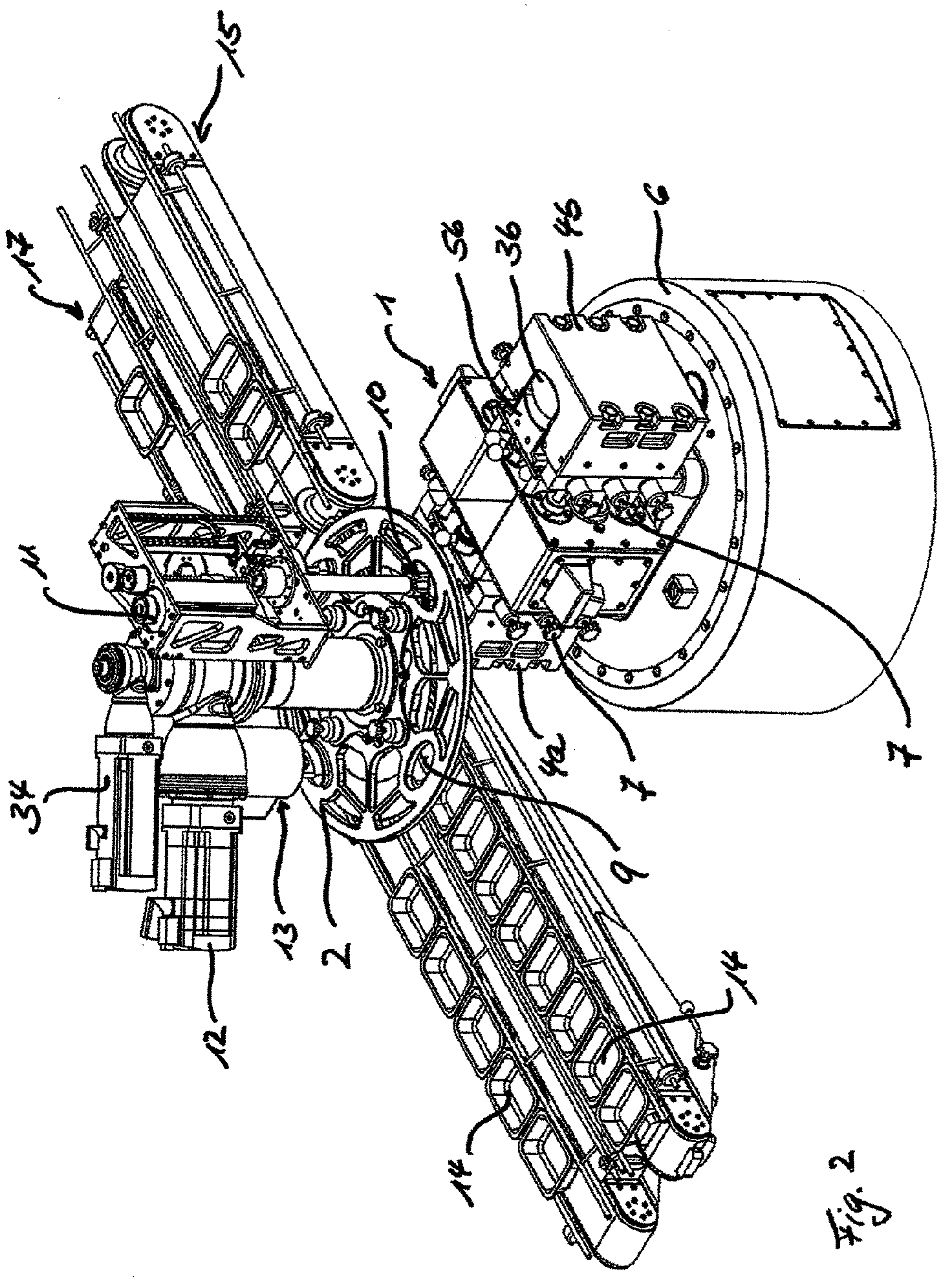
Figure 3:
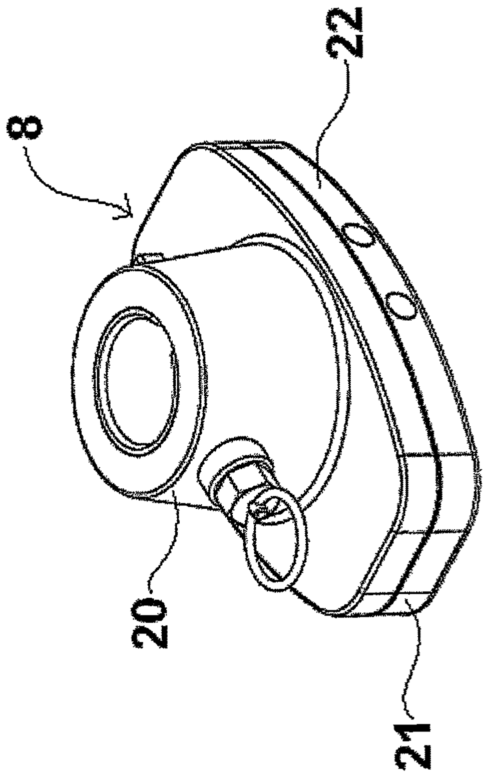
Figure 4:
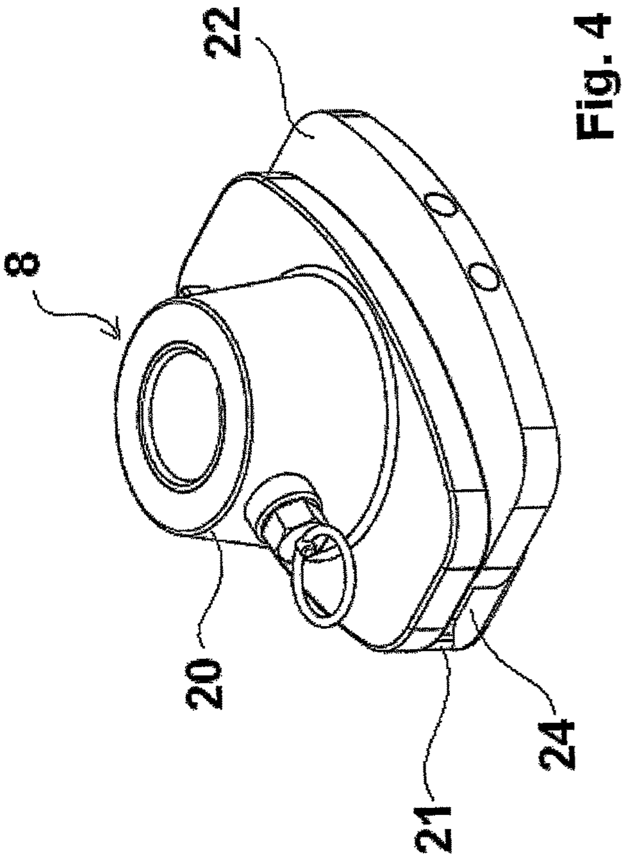
Figure 5:
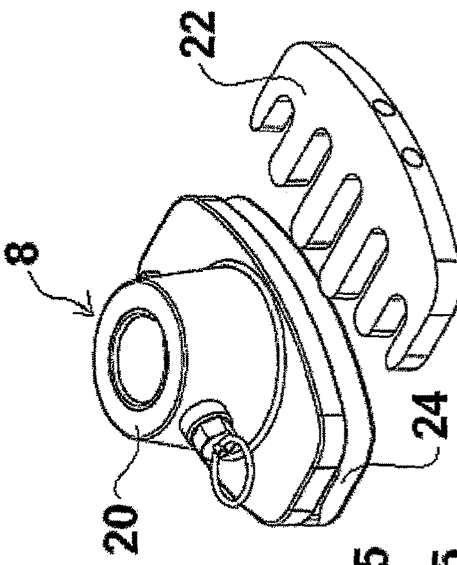
Figure 6:
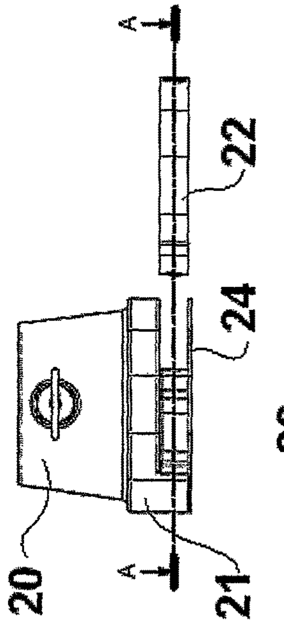
Figure 7:
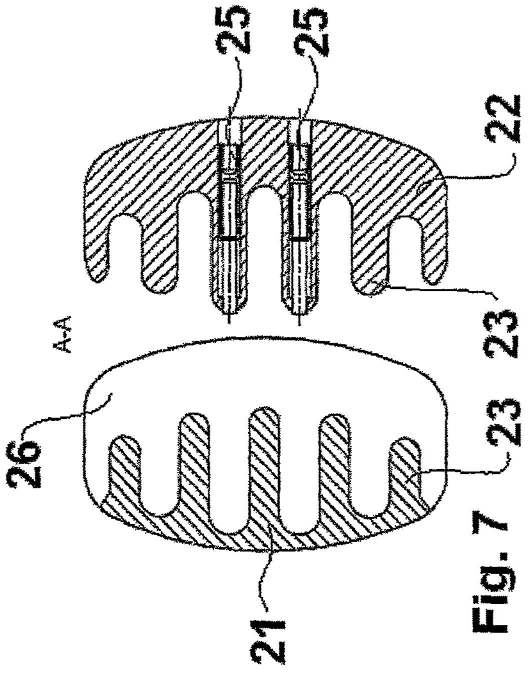
Figure 8:
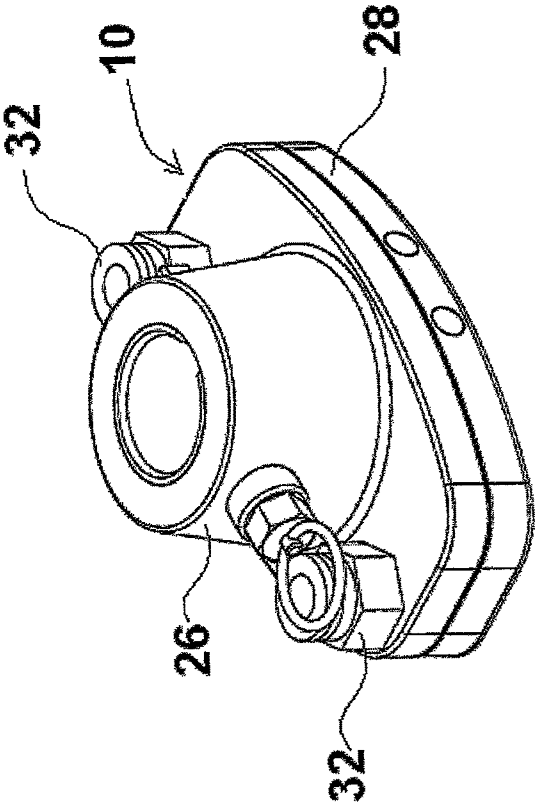
Figure 9:
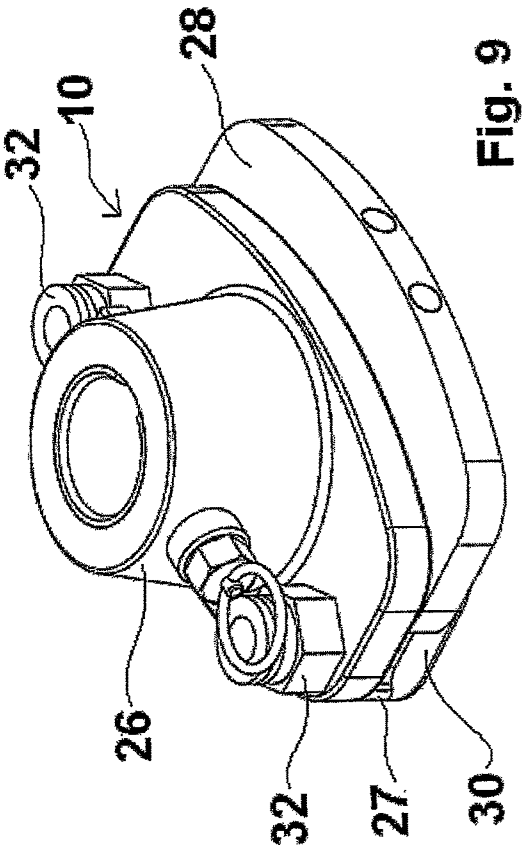
Figure 10:
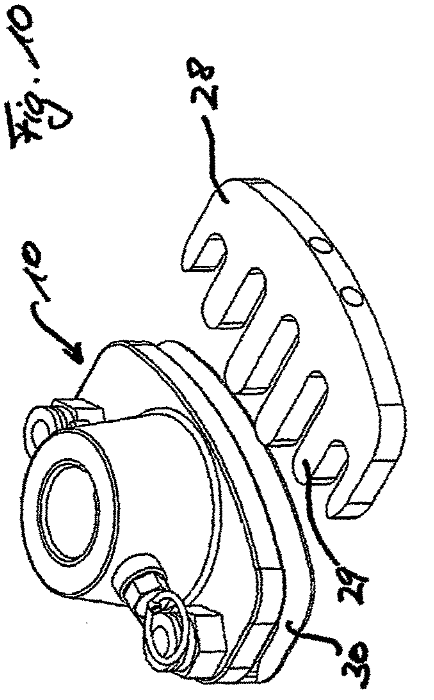
Figure 11:
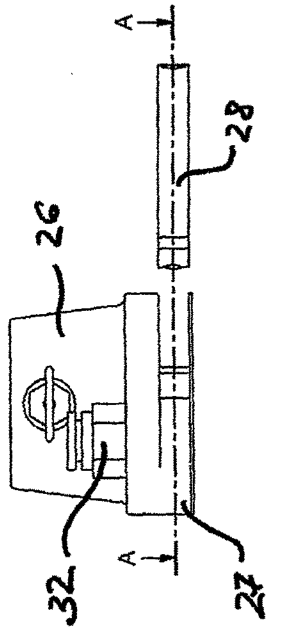
Figure 12:
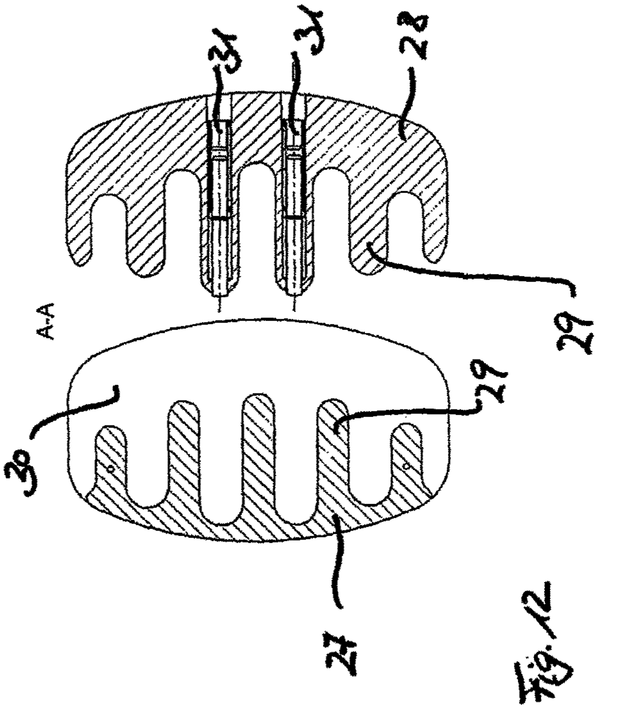
Figure 13:
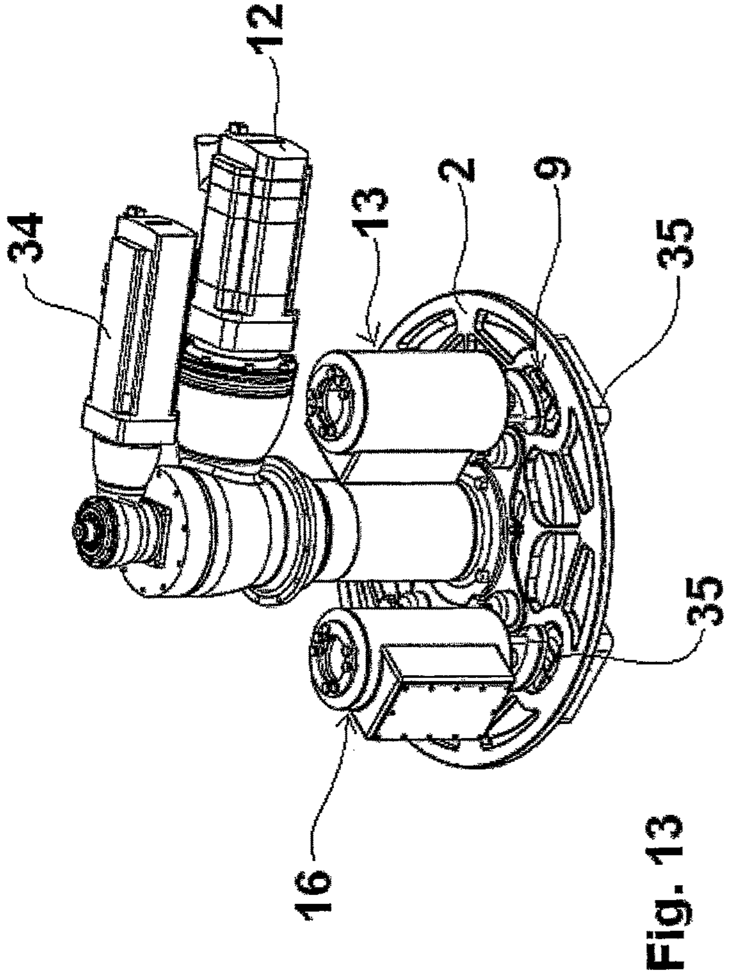
Figure 14:
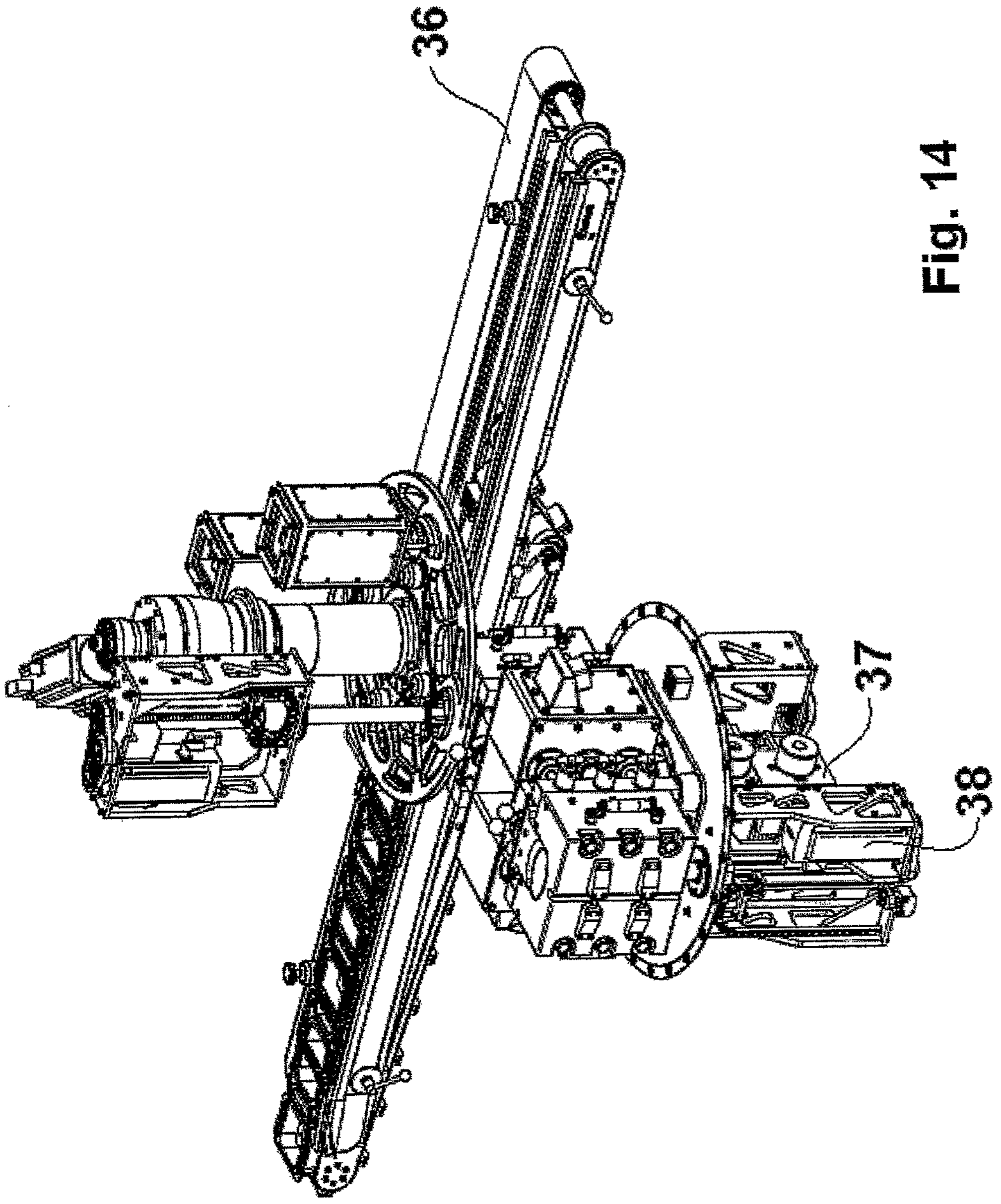
Figure 15:
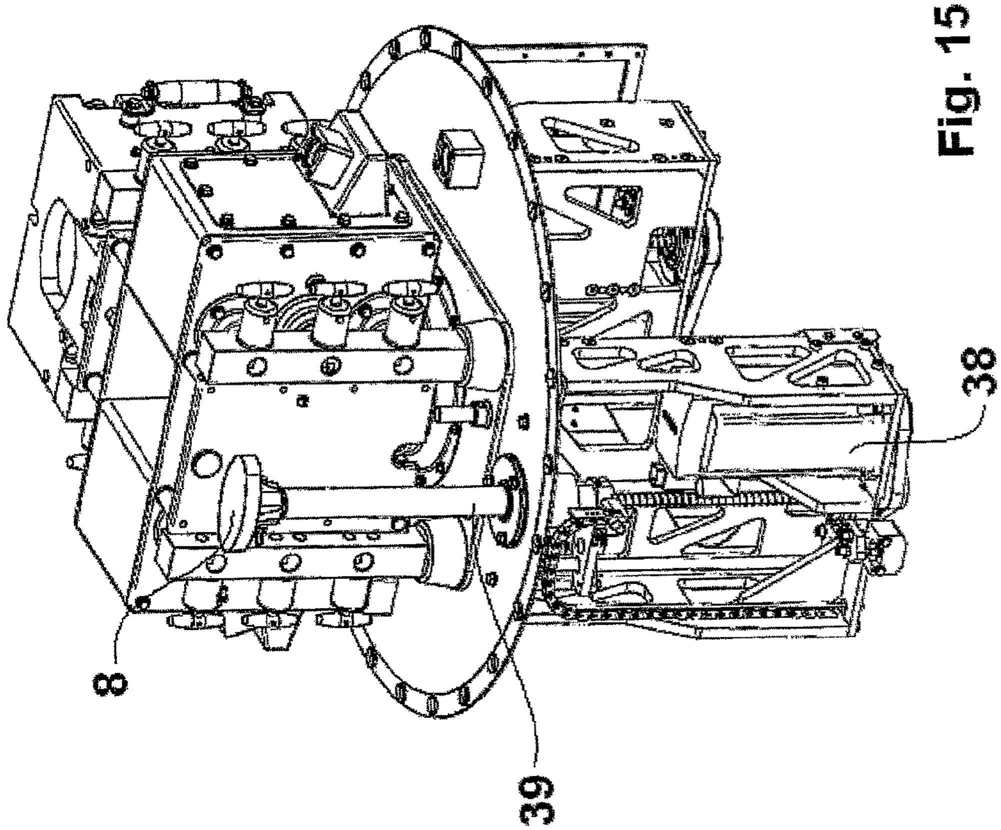
Figure 16:
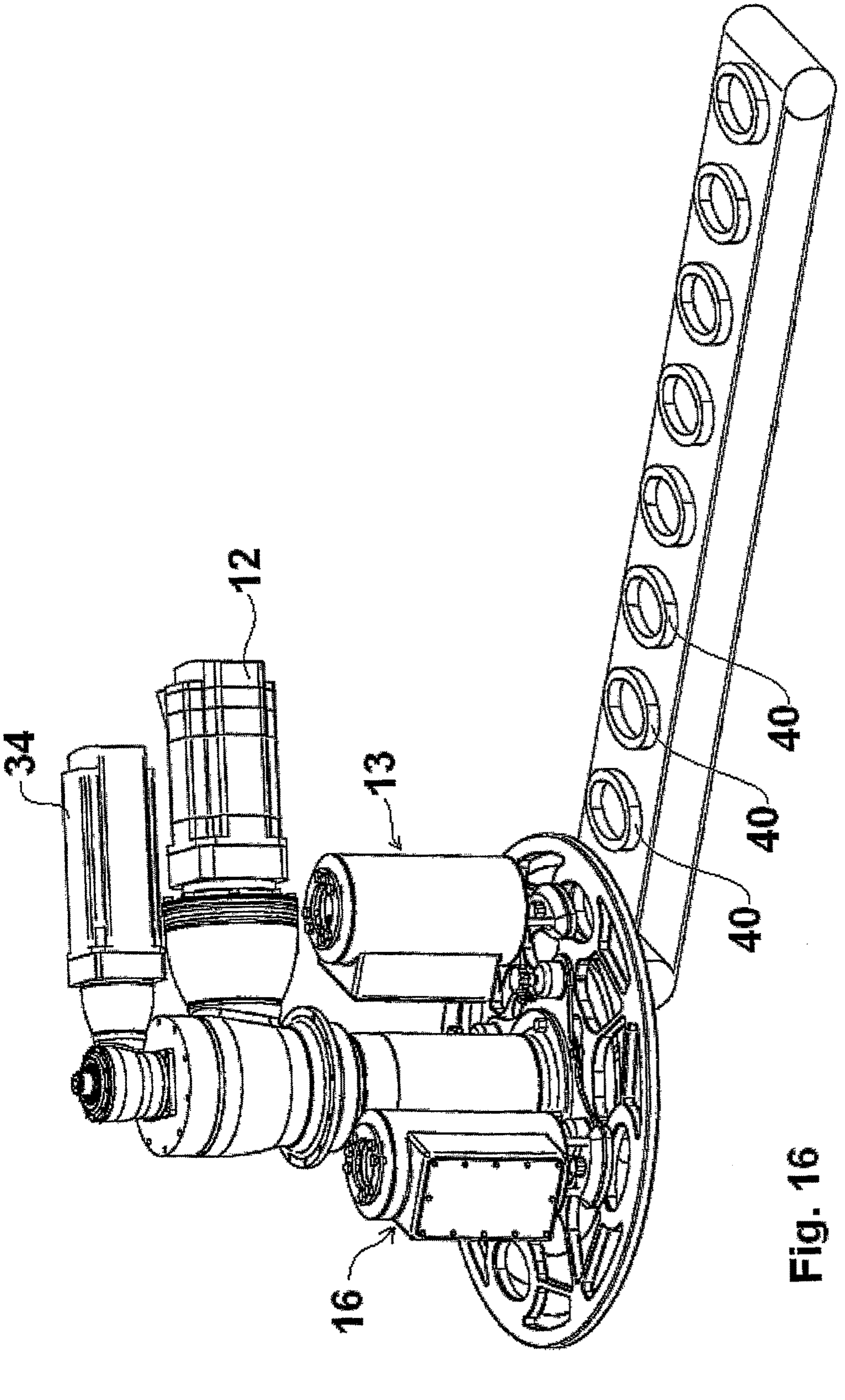

An exemplary embodiment of a device according to the invention is shown in the drawing. They show:

FIG. 1 Perspective view of a device for portioning meat with a press unit, a portioning plate and several transport devices, FIG. 2 Further perspective view of the device according to FIG. 1, FIG. 3 Perspective view of the pressure ram with the smallest possible press surface of a device according to FIG. 1, FIG. 4 Perspective view of the pressure ram according to FIG. 3 with the largest possible press surface, FIG. 5 Pressure ram according to FIG. 3 with pressure ram element completely withdrawn, FIG. 6 Side view of the pressure ram according to FIG. 5, FIG. 7 Section through the pressure ram according to FIGS. 3 through 6 along the plane labeled by A-A in FIG. 6, FIG. 8 Perspective view of a chamber floor with the smallest possible chamber floor area, FIG. 9 Chamber floor according to FIG. 8 with the largest possible chamber floor area, FIG. 10 Chamber floor according to FIGS. 8 and 9 with chamber floor element completely withdrawn, FIG. 11 Side view of the chamber floor according to FIG. 10, FIG. 12 Section through the chamber floor according to FIGS. 8 through 11 along the plane marked by A-A in FIG. 11, FIG. 13 Portioning plate of a device according to FIGS. 1 and 2 with additional molds for cutting cubes, FIG. 14 Perspective view of the device according to FIG. 1 without press unit drive housing, FIG. 15 Section from FIG. 14 regarding the press unit, FIG. 16 Portioning plate of a device according to FIGS. 1 and 2 with additional molds for further processing of the portions.

DESCRIPTION OF THE EXEMPLARY EMBODIMENT

FIGS. 1 and 2 show a device for portioning meat in two different perspective views. The device is composed essentially of a press unit 1, a portioning plate 2 and a knife arranged in a rotatable manner between the press unit and the portioning plate. The knife is not discernible in the perspective representation according to FIGS. 1 and 2. The press unit 1 has two press chambers 3*a* and 3*b*, which are delimited by in each case one press chamber housing 4*a* and 4*b* and in each case one closure element 5*a* and 5*b*. In the representations according to FIGS. 1 and 2, the press chamber 3*a* is located beneath the portioning plate 2 and therefore cannot be seen. This also applies to the closure element 5*a* of the press chamber 3*a*. Only the press chamber housing 4*a* is partially visible. The press unit 1 is driven by a press unit drive for rotation. This is arranged in the press unit drive housing 6. The press unit 1 essentially adopts two positions. In a first setting shown in FIGS. 1 and 2, the first press chamber 3*a* is located under the portioning plate 2 and the second press chamber 3*b* is located at the maximum distance from the portioning plate 2. In this setting, the piece of meat located in the press chamber 3*a* is divided into portions. The second press chamber 3*b* is not covered by the portioning plate 2 and therefore is freely accessible from above. A piece of meat can be inserted therein from above. In order to facilitate the insertion, the closure element 5*b* is drawn out of the press chamber housing 4*b* such that the cross section of the press chamber 3*b* has its largest possible starting setting. As soon as a piece of meat (not shown in the drawing) is inserted into the press chamber 3*b*, the closure element 5*b* is pushed into the press chamber housing 4*b* with the aid of a closure element drive 7, in order to reduce the cross section of the press chamber 3*b*. A force sensor (not shown in the drawing) thereby determines the force with which the piece of meat acts against the closure element drive 7. When a predetermined maximum force has been reached, the closure element 5*b* is stopped in its position. The cross section of the press chamber associated with the respective adjustment of the closure element 5*b* is established based on a displacement sensor, which is not discernible in the drawing either.

As soon as the piece of meat arranged in the first press chamber 3*a* has been completely divided into portions, the press unit 1 is rotated and the second portioning chamber 3*b* filled with a piece of meat is moved under the portioning plate 2. The first press chamber 3*a* is now empty and can be filled with a piece of meat again. This is carried out in the same manner as described above. The displacement of the closure elements 5*a* and 5*b* can be carried out before, during or after the rotation of the press unit 1.

The two press chambers 3*a* and 3*b* are constructed identically.

For portioning, a pressure ram 8 is inserted from below into the press chamber 3*a* or 3*b* arranged under the portioning plate 2. The pressure ram can also be referred to as a pressure piston. It is not discernible in FIGS. 1 and 2. It is shown in FIGS. 3 through 7 and 15. The pressure ram 8 presses the meat from below upwards into a portioning chamber 9 of the portioning plate 2 arranged above the press chamber 3*a* or 3*b*. The portioning plate 2 is equipped with a total of 4 portioning chambers 9. Above the position at which a press chamber 3*a* or 3*b* can be aligned with a portioning chamber 9, a chamber floor 10 is arranged in a displaceable manner in the vertical direction. To displace the chamber floor 10, a chamber floor drive 11 is provided. This is a servo drive with an electric motor. The chamber floor 10 is inserted into a portioning chamber 9 from above. The thickness and thus the weight of a portion depends on how far or how deep the chamber floor projects into the portioning chamber. The weight of the portions and the thickness thereof can thus be adjusted via the position of the chamber floor 10.

The piece of meat is pressed from below by the pressure ram 8 into the portioning chamber 9 closed by the chamber floor 10 so that the meat fills the entire portioning chamber. The pressure ram 8 and the chamber floor 10 thus press against one another. The portion that is located in the portioning chamber 9 is cut off from the piece of meat by means of a knife (not shown). To release the knife during the cutting operation, the pressure ram 8 and/or the chamber floor 10 can be drawn back. Subsequently, the chamber floor 10 is drawn upwards by the chamber floor drive 11, so that the portioning plate 2 can be rotated by the portioning plate drive 12. The rotation is carried out in this case by 90°, 180° or 270°. This depends on the quality of the portion. End pieces of the piece of meat, which have a lower weight than the predetermined target weight, can be separated, for example, from the other portions. The knife (not discernible in the drawings) is rotated together with the portioning plate 2 until the cut portion is located above the predetermined ejection position. Subsequently, the knife is returned to its starting position above the press chamber in order to cut off the next portion. The portioning chamber 9 is now open to below. With the aid of a ram-like ejection element 13, the cut portion is pressed out of the portioning chamber 9 downwards and falls into a container 14, which is moved by a transport device 15. A second ram-like ejection element 16 is located above a second transport device 17. Both of the ejection elements 13 and 16 are equipped with drives 18 and 19.

While a portion is ejected from a portioning chamber 9 with the aid of one of the two ejector elements 13 or 16 and deposited into a container 14, in a further portioning chamber 9 of the portioning plate 2, which is located above the press chamber 3*a*, a portion is measured and cut off from the piece of meat by the knife. This operation is repeated until the entire piece of meat arranged in the press chamber 3*a* has been divided into portions. Subsequently, the press unit 1 is rotated in order to divide up a further piece of meat into portions in the same manner.

In the transition from the position of a press chamber 3*a* or 3*b* below the portioning plate 2 into a position for filling the press chamber, the associated closure element 5*a* or 5*b* is drawn out of the press chamber housing 4*a* or 4*b* so that the cross section of the press chamber is enlarged again and the insertion of a piece of meat is facilitated. The position and the force of the closure element 5*a* or 5*b* are detected not only during the insertion of a new piece of meat, but also continuously during the positioning operation. If the force due to the shape of the piece of meat drops or increases during the positioning operation, the position of the closure element can be adjusted during the positioning operation.

FIGS. 3 through 7 show the pressure ram in different views. The pressure ram has a holder 20, to which a pressure ram rod 39, discernible in FIG. 15, can be attached, which transmits the movement of a pressure ram drive 38, discernible in FIGS. 14 and 15, to the pressure ram. The pressure ram 8 furthermore has two pressure ram elements 21 and 22, which are respectively equipped with finger-like extensions 23. The first pressure ram element 21 is fixedly connected to the holder 20. The second pressure ram element 22 is displaceable with respect to the first pressure ram element. The second pressure ram element 22 is guided for this purpose in a slot of the pressure ram 8 that is discernible in FIG. 6. The guide is furthermore intensified by the finger-like extensions 23, with which the pressure ram elements 21 and 22 engage in one another. The finger-like extensions 23 of the two pressure ram elements as well as the spacings between the finger-like extensions 23 are embodied identically in the two pressure ram elements 21, 22. On the side facing towards the press chamber, the two pressure ram elements 21 and 22 are covered by a plate 24. Two pins 25 are displaceably supported in two of the finger-like extensions 23 of the second pressure ram element 22. The pins are supported by springs (not discernible in the drawing) on the second pressure ram element 22. The springs press the two pins 25 outwards. They ensure that without the action of an external force the two pressure ram elements 21 and 22 have the largest possible spacing in the starting position according to FIG. 4. Only by the action of an external force can they be brought into the position shown in FIG. 3, in which the finger-like extensions 23 are so close to one another that there is no space or gap between them. In this setting, the pins 25 are pressed completely into the channels of the finger-like extensions 23 provided for this purpose. The force which presses the two pressure ram elements 21 and 22 together is exerted by a press chamber housing 4*a* and 4*b* and the associated closure element 5*a*, 5*b*.

The chamber floor 10 is shown in FIGS. 8 through 12, which chamber floor is adjustable with respect to its chamber floor area exactly like the pressure ram. The structure of the chamber floor with a holder 26, two chamber floor elements 27 and 28, finger-like extensions 29, a plate 30 as well as pins 31, corresponds to the structure of the pressure ram. The mode of operation is identical. The force that presses the two chamber floor elements 27 and 28 together is exerted by the portioning chamber 9 with the chamber floor 10. Furthermore, the chamber floor is additionally equipped with channels 32 and connections 33, in order to suction air out of the portioning chamber or to introduced compressed air into the portioning chamber. The suctioning of air promotes the complete filling of the portioning chamber with meat. The introduction of compressed air promotes the ejection of a portion from the portioning chamber.

FIG. 13 shows the portioning plate 2 with two ejector elements 13 and 16, a drive 34 for the knife as well as the portioning plate drive 12 and additional molds 35 below the portioning plate 2 with which a portion can be cut into cubes. Each of the two molds 35 is equipped with a gate of several blades. The two ejector elements 13 and 16 press a portion arranged in a portioning chamber 9 downwards into the molds 35, whereby the portion is cut into cubes. The cubes subsequently fall downwards and are fed to further processing.

FIG. 14 shows the device in a similar view as in FIG. 1. In contrast to FIG. 1, the second transport device 36 is embodied to be only half as long as the second transport device 17 in FIG. 1. Moreover, the press unit 1 is shown without press unit drive housing 6. For this reason in FIG. 14 the drive 37 for rotating the press unit 1 and the pressure ram drive 38 are discernible. The pressure ram drive 38 is a servo drive with an electric motor.

FIG. 15 shows a section from FIG. 14. In the section only the press unit 1 is shown. The press chamber housing 4*b* and the closure element 5*b* are missing, so that the pressure ram 8 with the pressure ram rod 39 are discernible. The pressure ram rod 39 transmits the stroke of the pressure ram drive 38 onto the pressure ram 8.

FIG. 16 shows a further exemplary embodiment of molds 40, into which a portion can be deposited after cutting by the portioning plate and an ejector element 13. The molds 40 do not contain any cutting tools. They merely feed the portions to further processing and thereby contain the form predetermined by the portioning chambers.

All of the features of the invention can be essential for the invention alone as well as in any combination with one another.

LIST OF REFERENCE NUMBERS

1 Press unit
2 Portioning plate
3*a* Press chamber
3*b* Press chamber
4*a* Press chamber housing
4*b* Press chamber housing
5*a* Closure element
5*b* Closure element
6 Press unit drive housing
7 Closure element drive
8 Pressure ram
9 Portioning chamber
10 Chamber floor
11 Chamber floor drive
12 Portioning plate drive
13 Ejector element
14 Container
15 Transport device
16 Second ejector element

17 Second transport device
18 Drive of the first ejector element
19 Drive of the second ejector element
20 Holder on the pressure ram
21 Pressure ram element
22 Pressure ram element
23 Finger-like extension
24 Plate
25 Pin
26 Holder on the chamber floor
27 Chamber floor element
28 Chamber floor element
29 Finger-like extension
30 Plate
31 Pin
32 Channel for compressed air
33 Connection for compressed air
34 Knife drive
35 Mold for cutting cubes
36 Second transport unit
37 Drive for rotating the press unit
38 Pressure ram drive
39 Pressure ram rod
40 Mold

The invention claimed is:

1. Device for portioning food into portions with a predetermined weight or a predetermined thickness, comprising:

a press unit with at least two elongated press chambers with respective closure element per press chamber for closing each respective press chamber at a side;

a closure element drive to displace the respective closure element in the respective press chamber and to adjust a cross section of the respective press chamber;

a pressure ram per press chamber, each equipped with a pressure ram drive to displace the respective pressure ram in a longitudinal direction of the respective press chamber;

at least two pressure ram elements defining a press surface for the pressure ram of each press chamber, the at least two pressure ram elements being movable with respect to one another to adjust a cross section of the respective press surface;

a portioning plate with several portioning chambers;

a portioning plate drive to move the portioning plate relative to the press unit;

a portioning chamber part arranged in a moveable manner on the portioning plate to cover a lateral opening of the respective portioning chamber and to adjust a cross section of the portioning chamber;

wherein at least one chamber floor of the portioning plate, with at least two chamber floor elements of the at least one chamber floor that are moveable with respect to one another to adjust a cross section of the at least one chamber floor;

a cutting element between the press unit and the portioning plate; and a cutting element drive in order to move the cutting element relative to the press unit.

2. Device according to claim 1, wherein the at least two pressure ram elements or the at least two chamber floor elements have several extensions on a side facing towards one another, the extensions engaging with one another in a joined state, a spacing of two adjacent extensions of the respective pressure ram elements or each chamber floor element corresponds to a width of one of the extensions of the other pressure ram element or the other chamber floor element.

3. Device according to claim 2, wherein at least an area of the extensions engaging with one another is covered by a plate.

4. Device according to claim 1, wherein the at least one chamber floor is arranged in a displaceable manner to adjust a depth of the respective portioning chamber.

5. Device according to claim 1, wherein a sensor to detect a force exerted by a piece of food on the respective closure element during displacement of the respective closure element in the respective press chamber is arranged on the closure element of the press chamber.

6. Device according to claim 1, wherein a displacement sensor is arranged on the respective closure element to determine a distance covered by the respective closure element when compressing a piece of food or to determine an absolute position of the respective closure element with respect to the respective press chamber.

7. Device according to claim 1, wherein the at least one chamber floor of the respective portioning chamber is equipped with channels for suctioning or emitting air or other gases.

* * * * *